(12) United States Patent
Jafari

(10) Patent No.: US 10,488,530 B2
(45) Date of Patent: Nov. 26, 2019

(54) FIBRE COUPLED LUMINESCENT BEAD DOSIMETER

(71) Applicant: TrueInvivo Limited, Surrey (GB)

(72) Inventor: Shakardokht Jafari, Surrey (GB)

(73) Assignee: TrueInvivo Limited, Surrey (GB)

(*) Notice: Subject to any disclaimer, the term of this patent is extended or adjusted under 35 U.S.C. 154(b) by 0 days.

(21) Appl. No.: 15/755,232

(22) PCT Filed: Aug. 26, 2016

(86) PCT No.: PCT/GB2016/052672
§ 371 (c)(1),
(2) Date: Feb. 26, 2018

(87) PCT Pub. No.: WO2017/033029
PCT Pub. Date: Mar. 2, 2017

(65) Prior Publication Data
US 2018/0246223 A1    Aug. 30, 2018

(30) Foreign Application Priority Data

Aug. 26, 2015 (GB) .................................. 1515143.4

(51) Int. Cl.
*G01T 1/115* (2006.01)
(52) U.S. Cl.
CPC .................................... *G01T 1/115* (2013.01)
(58) Field of Classification Search
CPC ............ G01T 1/115; G01T 1/10; G01T 1/105
See application file for complete search history.

(56) References Cited

U.S. PATENT DOCUMENTS 5,606,163 A * 2/1997 Huston .................. G01T 1/115
250/337

FOREIGN PATENT DOCUMENTS

| JP | 10307184 A | 11/1998 |
| WO | 2010118478 A1 | 10/2010 |
| WO | WO 2012/159201 A1 | 11/2012 |

OTHER PUBLICATIONS

International Search Report and Written Opinion for PCT/GB2016/052672 dated Jan. 18, 2017.
European Patent Office Examination Report for EP Application No. 16 762 833.8-1003, dated Aug. 5, 2019.

* cited by examiner

*Primary Examiner* — Hugh Maupin
(74) *Attorney, Agent, or Firm* — Chang & Hale LLP

(57) ABSTRACT

A dosimeter for recording a level of radiation exposure, and a reader for measuring the level of radiation recorded by the dosimeter, are disclosed. In some embodiments the dosimeter comprises at least one luminescent bead coupled to a fibre. The reader comprises a means for holding the dosimeter, stimulating means for stimulating a region of the dosimeter to cause luminescence, and a light detector for measuring intensity of light produced by the at least one bead during heating. In some embodiments the reader can be configured to record readings from a dosimeter comprising a fibre without beads. A system comprising the dosimeter and reader is disclosed. Methods of using the dosimeter, reader and system are also disclosed.

20 Claims, 8 Drawing Sheets

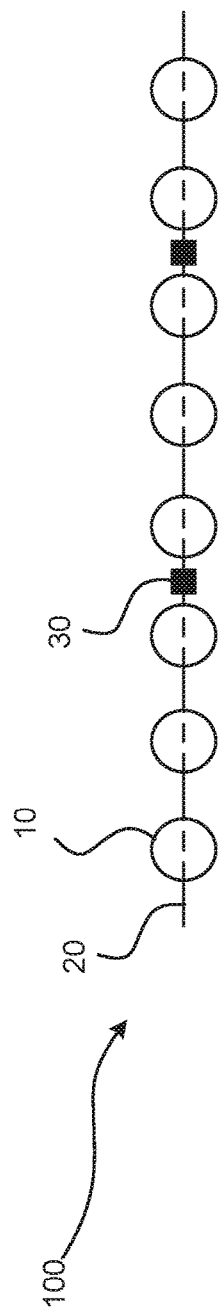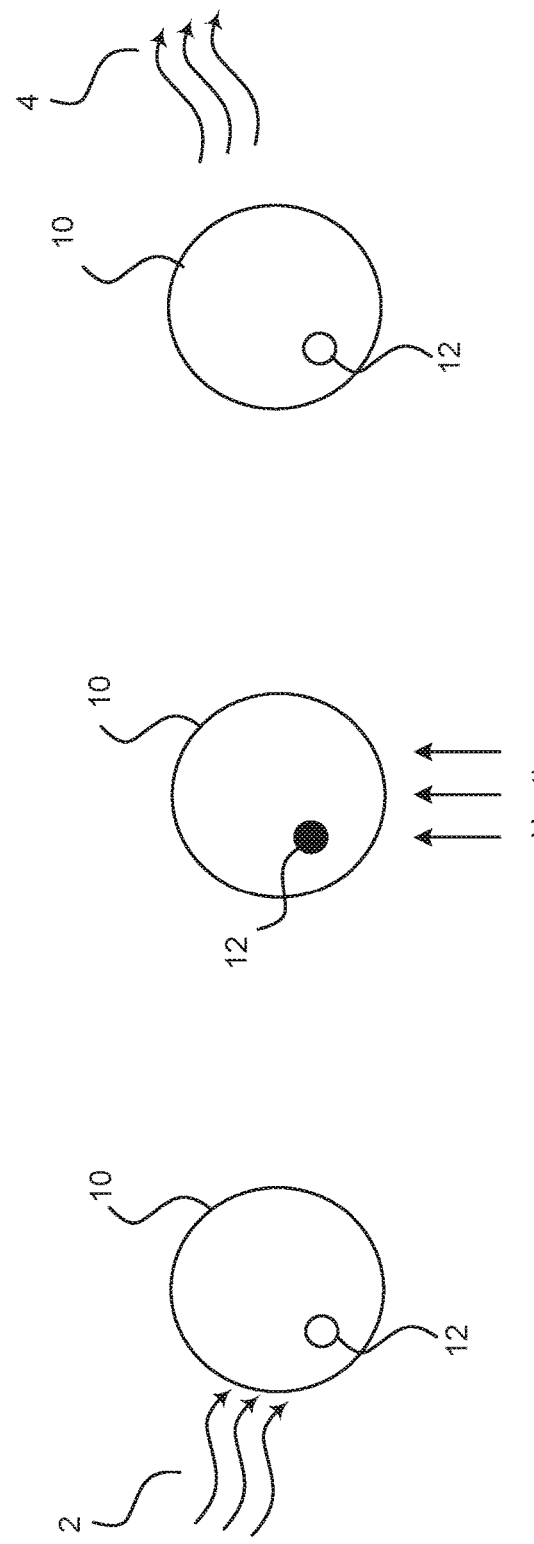

FIBRE COUPLED LUMINESCENT BEAD DOSIMETER

FIELD

The present invention relates to dosimeters. More specifically, the present invention relates to dosimeters and readers for recording and measuring a level of radiation exposure, and to corresponding methods.

BACKGROUND

In order to treat cancer, patients are usually exposed to radiation such as gamma rays or charged particles (for example, alpha particles). Beams of radiation are targeted so that the beam does not damage healthy tissue surrounding the cancerous tissue. It is necessary for hospitals to know the dosage, or level, of radiation that the user has been exposed to both at the site of the cancer and in surrounding areas. There is a need to record the level of radiation exposure, and to keep that data secure. Particularly in developing countries, where local treatment centres may only have limited resources, it is typical for the level of radiation exposure to be recorded locally and then transported to a central facility for analysis. Sometimes weeks can pass between recording of data and reading of data, and in that time data resolution (or accuracy) can decrease. It is therefore necessary to provide a means for storing data relating to level of radiation over a long period, particularly in high temperature environments.

Radiation dosimeter systems are also required for the measurement of the levels of radiation exposure, particularly in humans for the purpose of safety monitoring in environments where there is a risk to health from exposure to higher than recommended doses of radiation, for example, in nuclear power stations and nuclear-powered ships and submarines. Another important application of dosimeter systems is for monitoring radiation dose provided for sterilisation of objects, particularly food products, to ensure that a sufficient radiation dose is provided to kill microorganisms or biological pathogens which may be present on the objects.

Prior art devices for measuring radiation dosage include using Lithium Fluoride thermo-luminescent dosimeters (TLDs). However, these dosimeters are hydroscopic and so cannot be exposed to moisture. This is particularly difficult when working inside the human body. Furthermore, LiF dosimeters are commonly designed for dosages of less than 10 gray (Gy) as above 10 Gy the reading becomes non-linear. In the UK, radiotherapy treatment exposes users to doses in excess of 70 Gy (typically 20 Gy in one fraction of a treatment), so LiF dosimeters do not have enough fidelity, or resolution. Dosimeters have been developed for medical use which comprise disk-shaped radiation detectors. For in-vivo use, the disk-shaped detectors can be inserted into catheter tubes and placed in the body during radiotherapy treatment. The disks then have to be individually removed and placed into a cassette for reading in a machine. However, removing the disks and loading them into the cassette is a time-consuming and laborious process since the disks are difficult to manipulate, and consequently the overall procedure is slow and expensive.

Aspects of the present invention aim to address one or more drawbacks inherent in prior art methods and apparatus for measuring levels of radiation exposure, particularly in humans.

SUMMARY

According to a first aspect of the present invention, there is provided a dosimeter for recording a level of radiation exposure, the dosimeter comprising at least one luminescent bead coupled to a fibre.

Advantageously, the dosimeter provides a simple, flexible and convenient means for recording a level of radiation exposure. The dosimeter can be transported to a reading apparatus after exposure to radiation has occurred, with a reduced loss of data. The dosimeter can be inserted into a human or animal body without damage occurring due to moisture. Furthermore, the dosimeter provides a means for performing 2-dimensional dosimetry with the capability of a 3-dimensional arrangement.

The at least one bead may be a glass bead. Alternatively, the at least one bead may be made of diamond, transparent carbon nanotubes, or high-temperature resistant polymers. The at least one bead may also be made from optically stimulated luminescence materials such as aluminium oxide.

The at least one bead may be threaded onto the fibre. The at least one bead may be configured to slide along the fibre.

The at least one bead may be spherical. Alternatively, the at least one bead may have another shape, for example a three-dimensional polyhedron such as a cube.

The fibre may be a high-temperature resistant fibre. The high-temperature resistant fibre may be a high-temperature resistant yarn. For example, the high-temperature resistant fibre may be spun Kevlar, Nomex, silicon fibreglass, or ceramic fabric reinforced with glass. The high-temperature resistant fibre may also be a wire. More specifically, the high-temperature resistant fibre may be a thin metallic wire. The high-temperature resistant fibre may be configured to withstand temperatures in of at least 700 degrees Celsius. The high-temperature resistant fibre may be about 100 μm in diameter, such that it can be inserted into a biopsy needle.

Where the dosimeter comprises a plurality of beads, the dosimeter may further comprise at least one separator positioned between groups of beads along the fibre.

Where the dosimeter comprises a plurality of beads, the beads may have different colours with respect to each other. Alternatively, each group of beads may have a different colour with respect to each other, and the beads within a group may all have substantially the same colour.

The fibre may be tied at the ends to prevent beads from falling off the fibre. Alternatively, the ends of the fibre may be arranged such that the dosimeter can be coupled to a second dosimeter.

The dosimeter may comprise identification means, such as a barcode or RFID tag, for uniquely identifying the dosimeter among a plurality of dosimeters.

According to a second aspect of the present invention, there is provided an apparatus for measuring the level of radiation recorded by a dosimeter, such as a dosimeter according to the first aspect, the apparatus comprising:

a means for holding the dosimeter;

stimulating means for stimulating a region of the dosimeter to cause luminescence; and a light detector for measuring intensity of light produced by the region of the dosimeter during heating.

For example, the stimulating means may be a bead stimulating means, and the region of the dosimeter may comprise at least one bead.

The apparatus may be a reader.

The apparatus may further comprise a light blocking member having an aperture arranged between the light detector and the region of the dosimeter that is stimulated by the stimulating means The bead stimulating means may comprise an optical stimulating means configured to illuminate the region of the dosimeter with light of an intensity sufficient to cause electrons trapped in high-energy states in the region of the dosimeter to luminesce and/or heating means configured to heat the region of the dosimeter to a first temperature threshold sufficient to cause electrons trapped in high-energy states in the region of the dosimeter to thermo-luminesce. For example, when glass beads are used, the first temperature threshold is 300 degrees Celsius. Preferably, the first temperature threshold may be between 300 degrees Celsius and 700 degrees Celsius.

The light detector may be a photomultiplier tube. Alternatively, the light detector may be an array of photodiodes.

The apparatus may comprise means for moving the region of the dosimeter from a first region to a second region in proximity to the light detector. The first region may be an unheated region and the second region may be a heated region. When the region of the dosimeter comprises at least one bead, the means for moving the at least one bead may comprise a first rotatable holder configured to move the bead along the fibre. The first rotatable holder may be configured to separate one bead from a plurality of beads. Alternatively, the means for moving the region of the dosimeter may comprise a rotatable drum for drawing in the fibre of the dosimeter. In this embodiment, the at least one bead may be fixed to the fibre. The means for moving the at least one bead may comprise a roller positioned above or below the at least one bead.

The stimulating means may be disposed in proximity to the light detector.

The apparatus may comprise a pre-stimulating means. The pre-stimulating means may be bead pre-stimulating means. The pre-stimulating means may be disposed between the first region and the second region in proximity to the light detector. The pre-stimulating means may be preheating means, such as bead preheating means. The preheating means may be configured to heat the region of the dosimeter to a second temperature threshold, wherein the second temperature threshold is a sufficiently high temperature to free any electrons that may be trapped in relatively shallow energy states and return these electrons to the ground state. In other words, the second temperature threshold is not sufficient to cause electrons trapped in high-energy states in the region of the dosimeter to thermo-luminesce.

Alternatively, the pre-stimulating means may be pre-illumination means, such as bead pre-illumination means. The pre-illumination means may comprise an irradiation unit for illuminate the region of the dosimeter with light of an intensity is sufficiently high frequency to free any electrons that may be trapped in relatively shallow energy states and return these electrons to the ground state. In other words, the pre-illumination means generates light of an intensity that is not sufficient to cause electrons trapped in high-energy states in the region of the dosimeter to luminesce.

The preheating means and, where the stimulating means is a heating means, the heating means, may be second and third rotatable holders. The third rotatable holder may be a planchet. The second and third holders may include heating elements. Alternatively, the second and third holders may be heating elements. The shape of the second and third holders may be configured to provide the greatest surface area with which the at least one bead can come into contact, while allowing the at least one bead to freely enter and leave the holder. The third holder may comprise material that does not tarnish when exposed to heat. Preferably, the second holder may comprise gold, platinum or stainless steel.

Alternatively, where the stimulating means is an optical stimulating means, the optical stimulating means and pre-illumination means may comprise an irradiation unit. The irradiation unit may comprise a laser, lamp, or LED.

Alternatively, the preheating means and/or heating means may comprise a heating element provided beneath the region of the dosimeter when the region of the dosimeter is positioned between the first region and the second region, and in the second region, respectively.

The apparatus may comprise a controller for converting the measured light intensity into an indicator of level of radiation exposure. Alternatively, the apparatus may comprise a communication unit for transmitting the measured light intensity to an external device for processing. The apparatus may comprise a display for displaying the level of radiation exposure.

Each of the pre-stimulating means and stimulating means may comprise a switch and power supply. The power supply may be a battery for supplying direct current (DC) power. Alternatively, the power supply may be an alternating current (AC) power source. The switch may be a transistor switch. The switch may be manually operated. Alternatively, the switch may be operated automatically, or by the controller. The controller may activate the preheating means and/or the stimulating means when the at least one bead is in contact with a predetermined location.

Alternatively, the pre-stimulating means and stimulating means may be coupled to a single power supply.

The controller may further be configured to store the level of radiation exposure in memory. The controller may further be configured to store the level of radiation exposure along with a means for identifying the measured bead. The means for identifying the measured bead may comprise a means for identifying a location in the patient where the bead was located when exposed to radiation. The controller may be configured to identify the measured bead. For example, the controller may be configured to detect the colour of the at least one bead, or record the at least one bead's position with reference to a separator.

The apparatus may comprise a means for identifying the dosimeter. The means for identifying the dosimeter may comprise a barcode reader for reading a barcode included on a dosimeter. Alternatively, the means for identifying the dosimeter may comprise an RFID tag reader.

According to a third aspect of the present invention, there is provided a system comprising a dosimeter according to the first aspect and an apparatus according to the second aspect.

According to a fourth aspect of the present invention, there is provided a system comprising a dosimeter comprising a silica fibre and an apparatus according to the second aspect.

According to a fifth aspect of the present invention, there is provided a method of recording a level of radiation exposure in a patient, the method comprising:
coupling at least one luminescent bead to a fibre;
feeding the fibre and the at least one bead through an area of the patient's body to be irradiated;
irradiating the patient; and
removing the irradiated at least one bead and fibre from the patient. The irradiated bead now records the level of radiation exposure.

According to a sixth aspect of the present invention, there is provided a method comprising:
   attaching an irradiated dosimeter to a reader;
   stimulating a region of the dosimeter; and
   measuring the intensity of light generated by the region of the dosimeter. For example, the region of the dosimeter may comprise at least one luminescent bead. The dosimeter may additionally or alternatively comprise a silica fibre.

Stimulating the region of the dosimeter may comprise optically stimulating the region of the dosimeter with light of an intensity sufficient to cause electrons trapped in high-energy states in the region of the dosimeter to luminesce and/or heating the region of the dosimeter to a first temperature threshold. The first temperature threshold may be set in order to cause electrons trapped in high-energy states in the region of the dosimeter to thermo-luminesce. The first temperature threshold may be between 300 degrees Celsius and 700 degrees Celsius. For example, when glass beads are used, the first temperature threshold is 300 degrees Celsius.

The method may comprise moving the region of the dosimeter from a first region to a second region in proximity to a light detector. The first region may be an unheated region and the second region may be a heated region. The method may comprise separating one bead from a plurality of beads, and moving the one bead from the first region to the second region in proximity to the light detector.

The method may comprise pre-stimulating the region of the dosimeter before the region of the dosimeter moves to the second region in proximity to the light detector. Pre-stimulating the region of the dosimeter may comprise heating the region of the dosimeter to a second temperature threshold. The second temperature threshold may be a sufficiently high temperature to free any electrons trapped in low-energy states and return the electrons to the ground state. In other words, the second temperature threshold is not sufficient to cause electrons trapped high-energy states in the region of the dosimeter to thermo-luminesce.

Alternatively, pre-stimulating the region of the dosimeter may comprise illuminating the region of the dosimeter with light of an intensity that is sufficiently high frequency to free any electrons trapped in low-energy states and return the electrons to the ground state. In other words, the intensity of the light is not sufficient to cause electrons trapped in high-energy states in the region of the dosimeter to luminesce.

The method may comprise converting the measured light intensity into a level of radiation exposure, based on a known correlation between intensity of light and level of radiation exposure for a material from which the region of the dosimeter is formed. The method may comprise storing the level of radiation exposure in memory. The method may comprise identifying the measured bead. For example, the method may comprise detecting the colour of the at least one bead, or recording the at least one bead's position with reference to a separator. The method may comprise storing the level of radiation exposure along with a means for identifying the measured bead. Alternatively, the method may comprise transmitting the measured light intensity value, or the level of radiation exposure, and/or the means for identifying the measured bead to an external device.

The method may comprise controlling switches to supply power to pre-stimulating means and stimulating means for respectively pre-stimulating and stimulating the region of the dosimeter. The method may comprise determining the location of the at least one bead and activating the switches according to the determination. In other words, the method may comprise determining the location of the at least one bead and stimulating the at least one bead or pre-stimulating the at least one bead according to the determination.

The method may comprise reading and storing identification means from the dosimeter, such as a barcode or RFID tag information.

According to a seventh aspect of the present invention, there is provided a method of recording and reading a level of radiation exposure, the method comprising:
   coupling at least one luminescent bead to a fibre;
   feeding the fibre and the at least one bead through an area of the patient's body to be irradiated;
   irradiating the patient;
   stimulating the at least one bead when it exits the patient; and
   measuring the intensity of light generated by the at least one bead.

All features described herein (including any accompanying claims, abstract and drawings), and/or all of the steps of any method or process so disclosed, may be combined with any of the above aspects in any combination, except combinations where at least some of such features and/or steps are mutually exclusive.

BRIEF DESCRIPTION OF THE FIGURES

Embodiments of the present invention will now be described, by way of example only, with reference to the accompanying drawings, in which:

FIG. 1 shows an embodiment of a dosimeter according to the present invention;

FIG. 2 shows how the dosimeter of FIG. 1 stores and releases radiation;

In the drawings, like reference numerals refer to like features throughout.

DETAILED DESCRIPTION

Figure 3:
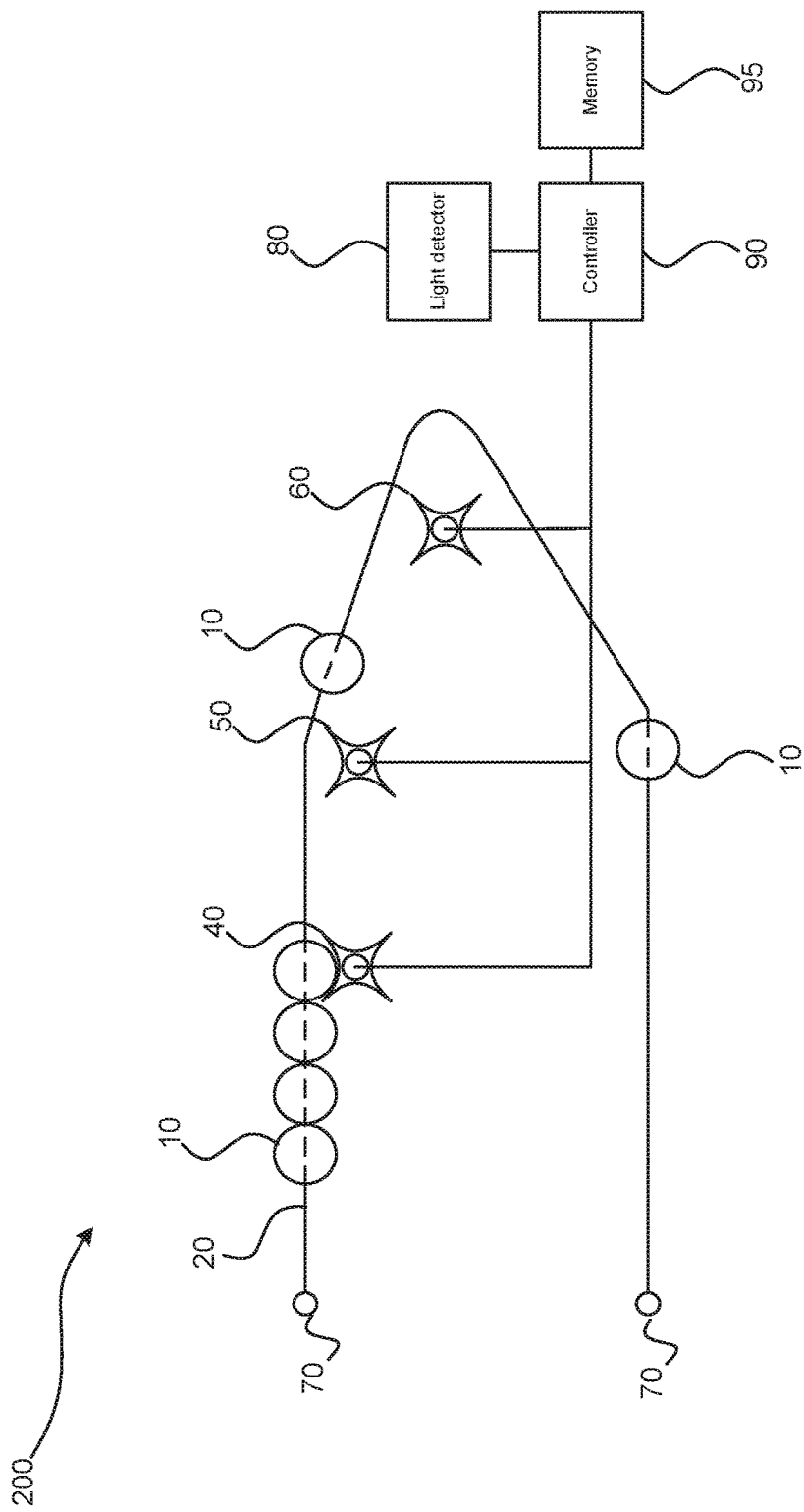
FIG. 3 shows a first embodiment of a reader according to the invention.

With reference to FIG. 1, a dosimeter 100 is shown that comprises a plurality of luminescent beads 10. In this embodiment, the beads are thermo-luminescent and made of glass, although in other embodiments different thermo-luminescent materials may be used for the beads. For example, the beads 10 may be formed of diamond, transparent carbon nanotubes, or high-temperature resistant thermo-luminescent polymers, such that they lose little data prior to heating in a reader. Alternatively, the beads 10 may be made of optically stimulated luminescence materials, such as aluminium oxide, to prevent data loss before being exposed to optical stimulation in a reader.

In the present embodiment the thermo-luminescent beads 10 are spherical, although in other embodiments other shapes of bead could be used. A passage is driven through the centre axis of the beads 10, although it would be understood that the passage does not need to be precisely aligned with the centre axis.

The beads 10 are strung, or threaded, onto a fibre 20. The fibre 20 is a high-temperature resistant fibre when the dosimeter 100 is to be used in a reader 200 for causing thermo-luminescence. Additionally, a high-temperature resistant fibre 20 is preferable for when heat sterilisation is used.

In this embodiment, the diameter of the passage is the same as the diameter of the high-temperature resistant fibre 20, with the result that friction between the high-temperature resistant fibre 20 and the inside wall of the passage causes the beads 10 to remain in place on the fibre 20. However, the beads 10 can still be made to slide along the high-temperature resistant fibre 20 when a force greater than a threshold is applied to overcome the friction between the fibre 20 and the bead 10. In other embodiments, the diameter of the passage may be larger than the diameter of the fibre 20, so that the beads 10 can slide freely along the fibre 20. In such embodiments, a suitable mechanism may be provided to stop the beads sliding along the fibre 20 whilst in the patient's body. For example, the fibre 20 may temporarily be tied at either end of the row of beads 10, or the beads may be inserted into a tight-fitting sleeve such as a catheter tube.

The high-temperature resistant fibre 20 in this embodiment is a silica glass fibre, similar to an optical fibre. The high-temperature resistant fibre 20 may be tied or otherwise obstructed at the ends, to prevent beads 10 from falling off the fibre 10. The beads 10 are transferable to a longer heat-resistant fibre 20 if necessary.

In this embodiment, the plurality of beads 10 are divided into groups by separators 30. The separators are positioned between groups of beads 10, as shown in FIG. 1, and provide a frame of reference so that it can easily be determined where in the patient the bead 10 was positioned when it was exposed to radiation.

To further improve the ability to determine where the beads 10 were positioned when they were exposed to radiation, different colours can be used for different groups of beads 10, whereby the beads within a particular group have the same or similar colour. Coloured beads may be used for coding, as each colour gives a different reading when stimulated with the same amount of heat or radiation.

The thermo-luminescent properties of the beads 10 will now be described with reference to FIG. 2.

First, the bead 10 is exposed to radiation 2, such as gamma rays (high energy photons). An electron 12 in low energy state, indicated by an open circle in FIG. 2, absorbs energy from an incident photon and transitions to a higher energy state, indicated by a solid circle in FIG. 2. In other words, the electrons 12 are excited and become trapped in a high energy state. The number of excited electrons is proportional to the radiation dose. As the bead 10 is formed from an insulating material (glass), the electrons are stable in high-energy states. In this way, the bead 10 can then be transported with the information about the radiation dosage stored in the bead 10 as excited electrons trapped in high-energy states.

When it is necessary to read the radiation data stored in the bead 10, the bead 10 is heated to a sufficiently high temperature to cause the excited electrons in high-energy states to relax to the ground state. For example, a temperature of approximately 300 degrees Celsius may be used during the reading stage. The excited electron 12 then transitions to a lower energy level, and releases energy as a photon 4. The photons 4 are detectable by a light detector such as a photo-multiplier tube. The energy emitted as photons 4 is proportional to the input radiation, and so the original radiation dosage can be calculated from the intensity of the photons 4.

Once all electrons trapped in high-energy states have been returned to the ground state, the bead 10 has effectively been 'reset' to the starting state, and can be reused.

A similar luminescence process occurs in materials sensitive to optical stimulation, except here the beads 10 are not heated. This process can be referred to as Optically-Stimulated Luminescence (OSL), or opto-luminescence.

With reference to FIG. 3, a reader 200 is shown that comprises anchors 70 for securing the fibre 20 of a dosimeter 100, a bead stimulating means 60, and a light detector 80. In this embodiment, the light detector 80 is a photomultiplier tube. Although not shown, preferably the reader 200 further includes guides for ensuring the fibre 20 is kept taut when inserted into the reader between the anchors 70.

The following description of FIG. 3 relates to a reader 200 for causing beads 10 to thermo-luminesce. In other words, the bead stimulating means 60 is a heating means that heats the beads 10 to a temperature such that they undergo thermo-luminescence. Therefore, it is necessary for the beads 10 to be coupled to a high-temperature resistant fibre 20. However, in other embodiments, the high-temperature resistant fibre 20 is not necessary. In these embodiments, for example those described with reference to FIG. 7, the reader 400 is designed to cause the beads 10 to undergo luminescence through a process of optical stimulation. In these embodiments the stimulating means 620 is an optical stimulating means. Furthermore, in these embodiments, the beads 10 are kept in the dark to prevent luminescence occurring prior to them reaching the optical stimulation means, which is not necessary in the presently described embodiment.

In further embodiments, the stimulating means 60 stimulates the beads 10 both thermally and optically in the same reader 200.

There is further provided a means for moving a bead 10 from a first, unheated, region of the reader 200 to a second, heated, region in proximity to the light detector 80. The means for moving the bead 10 also moves the bead 10 out of the heated region and back into an unheated region for storage. In embodiments where the stimulating means 620 is an optical stimulating means, the second region is not heated.

The means for moving the bead 10 according to this embodiment comprises first, second and third holders 40, 50, 60. The holders 40, 50, 60 are shaped to collect a bead 10 as they rotate about their central axis, and feed the bead 10 onto the following holder 40, 50, 60. The outer surface of each holder 40, 50, 60 is divided into recesses each configured to receive a single bead. In the embodiment shown in FIG. 3, each holder 40, 50, 60 has four recesses, although it would be clear that this is not intended to be limiting and other numbers of recesses may be provided in each holder in other embodiments. The bead 10 is able to freely enter and leave the recess as the holder 40, 50, 60 rotate.

In this embodiment, the first holder 40 is not heated. The first holder 40 can be driven by a motor to cause it to rotate about its central axis. The first holder 40 is configured to separate a first bead 10 from a group of beads. Further unheated holders may be provided, as required, to move beads 10 towards or away from the heated region.

Once separated, the bead 10 is passed on to the second holder 50. In this embodiment, the second and third holders 50, 60 respectively provide a means for preheating and a means for heating the bead 10. The second holder 50 heats the bead 10 to a first temperature, and the third holder 60 heats the bead 10 to a second temperature. In some embodiments, the third holder 60 is a planchet.

The first temperature is lower than the second temperature. Optimally, the bead 10 is preheated to a sufficiently high temperature to free any electrons that may be trapped in relatively shallow energy states and return these electrons to the ground state, without causing the bead 10 to thermoluminesce at dosimetric peak. For example, a temperature of 160 degrees Celsius may be used for the first temperature, when the beads are formed from glass. This ensures that the only excited electrons remaining in the bead are those which have been trapped in high-energy states as a result of exposure to radiation. Pre-heating in this way reduces noise when the bead is subsequently heated to a higher temperature, in order to release the electrons in high-energy traps and record a luminescence reading that is proportional to the radiation dosage to which the bead was exposed.

Additionally, the provision of separate heating means for the pre-heating and reading stages means that pre-heating and reading can be performed in parallel, whereby one bead is being pre-heated whilst another is being heated to the second, higher, temperature in the reading stage. This reduces the overall time required for processing in the dosimeter 100, since a bead is already at an elevated temperature when it arrives at the reading stage, and hence less time is required to raise the bead to the second temperature. Heat transfer between the bead 10 and the holders 50, 60 is optimised by the shape of the recesses of the holders 50, 60. For example, the recesses can be configured so that a relatively high proportion of the surface area of a bead is in contact with the surface of the holder 50, 60. For example, up to 50% of the surface area of a spherical bead may be in contact with the holder 50, 60 when the recesses are hemispherical.

The bead is then passed on to the third holder 60, which heats the bead to a second temperature in order to cause thermo-luminescence. The second temperature depends on the material which the bead 10 is made of. For example, when the beads 10 are made of glass, the bead is heated to 300 degrees Celsius or higher. The third holder 60 is disposed in proximity to, and in line of sight of, the light detector 60.

The third holder 60, facing the light detector 80, comprises material that does not tarnish when exposed to heat. This ensures that the colour of the third holder 60 remains constant over long time periods, so that readings recorded over long time periods can be compared to one another without being distorted by changes in colour of the third holder 60. Specifically, the third holder 60 in this embodiment is made of stainless steel. In other embodiments, the third holder 60 may be coated with an inert coating, for example gold or platinum. The first, second and third holders 40, 50, 60 may be made of the same material as each other to reduce complexity of manufacturing the reader 200.

The preheating means 50 is advantageous, but not essential to the operation of the reader 200.

To save power, the light detector 80 may only be powered on when the third holder 60 actively heats the bead 10. This is controlled by a controller 90. The controller 90 is further configured to drive the rotation of each holder 40, 50, 60. The controller 90 controls heating of the second and third holders 50, 60 so that the temperature of each does not exceed a threshold as described above, and so they are not heated when they are not in contact with a bead 10.

The intensity of light detected from a thermo-luminescent bead 10 is proportional to the level of radiation that the bead 10 was irradiated with. Therefore, the controller 90 can determine the dose of radiation experienced by the bead 10.

As each bead 10 is separately heated and measured, and each bead 10 (or group of beads) is identifiable from amongst a plurality of beads 10 using colours or separators 30, the controller 90 can determine where in the patient a particular bead 10 was located when it was exposed to radiation. The controller 90 is configured to store the radiation data (dosage) and relative position of the bead 10 in memory 95. The controller 90 also stores barcode information that is present in a barcode on the dosimeter 100, so that the stored radiation data can be matched to a patient offline.

The memory 95 is solid state memory that can be removed and inserted into a display device, such as a computer or PDA, so that the radiation data can be read and analysed. In other embodiments, the controller 90 transmits the radiation data directly to the display device by wireless or wired connected.

Figure 4:
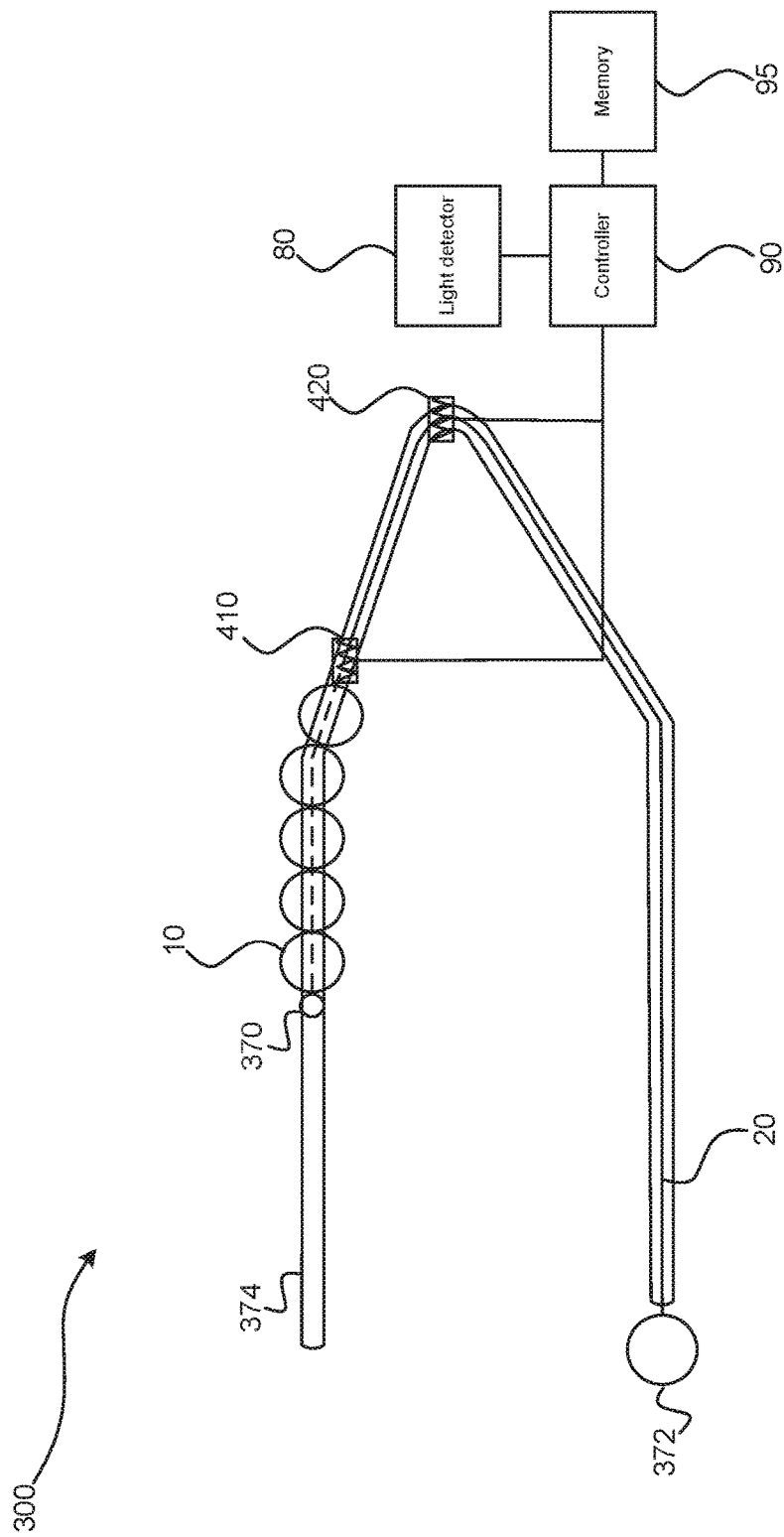
FIG. 4 shows a second embodiment of a reader according to the invention.

FIG. 4 shows a reader 300 according to another embodiment of the present invention. Here, the beads 10 are fixed to the high-temperature fibre 20. One anchor 370 is translatable along a track 374, and the other anchor in the embodiment shown in FIG. 3 is replaced by a windable drum 372. The beads 10 are pulled in front of the light detector 80 by the winding of the drum 372. The track 374 extends from the non-heated area, past the light detector 80 and ends in proximity to the windable drum 372. In this embodiment, separators 30 are inserted between the beads 10 to prevent beads 10 from being stimulated prematurely.

The anchor 370 is pulled along by the rotation of the windable drum 372. The anchor 370, when moving, pushes on the rear-most bead of a string of beads 10, which in turn pushes on the next bead 10 in the string. In other words, the beads 10 are pushed along the track 374 in a group. In this embodiment, the separator 40 is not required. In other words, the windable drum 372 is a means for moving the beads 10 from an unheated position to a heated position in proximity to the light detector 80.

As in the previous embodiment, each bead 10 is individually preheated by a preheating means 410 and heated again to a higher temperature when it is in proximity to the light detector 80 by a heating means 420. In this embodiment, the preheating means 410 and heating means 420 are heating elements disposed beneath the track 374.

In a further development of the embodiment shown in FIG. 4, holders may be used as the preheating means 410 and heating means 420, similarly to the embodiment shown in FIG. 3.

The preheating means 50, 410 and heating means 60, 420 will be described in more detail with reference to FIGS. 5a, 5b and 6.

Figure 5B:
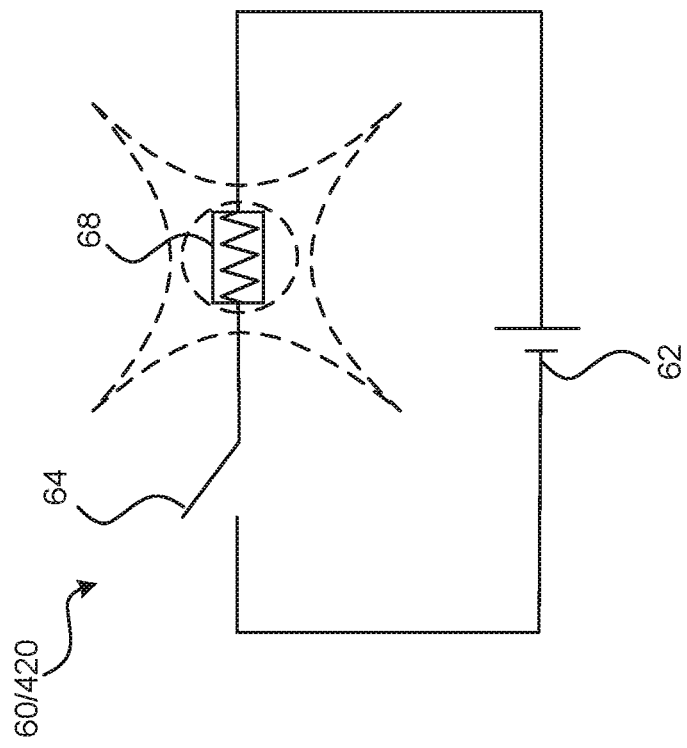
FIGS. 5a and 5b show one embodiment of means for heating beads of the reader according to the present invention.
Figure 5A:
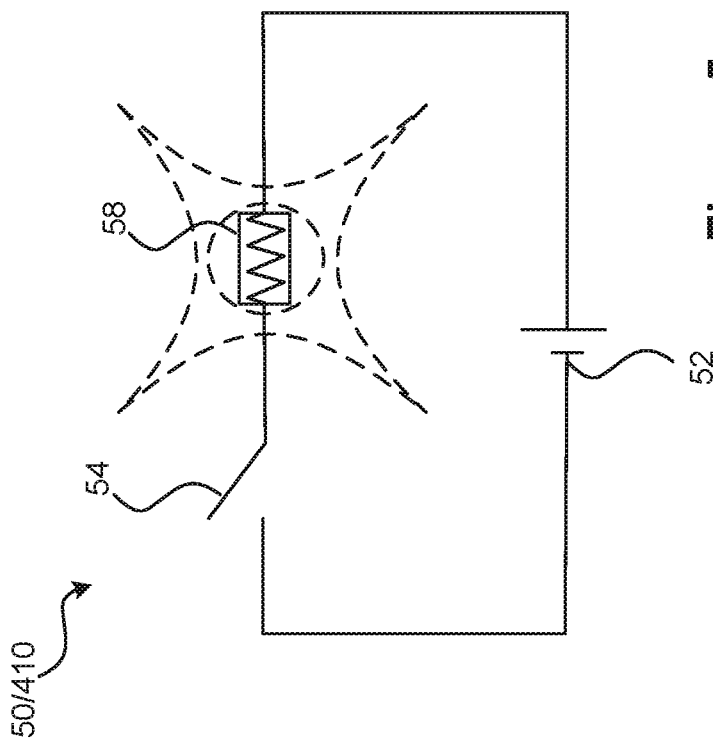

FIG. 5a shows an example of a preheating means 50, 410 according to the present invention. The preheating means 50, 410 comprises a heating element 58. The heating element 58 is an electric heating element, such as a resistor. Here, the heating element 58 constitutes part of a holder, and heats the outer surfaces of partitions making up the holder. In other embodiments, the preheating means 50, 410 may comprise hot gas. In embodiments in which the beads are formed from a material that is capable of opto-luminescence, the preheating means 50, 410 should not emit light that is detectable at the bead 10.

The preheating means 50, 410, includes a power supply 52. The power supply 52 in this embodiment is a battery for supplying a direct current. In other embodiments, the power supply 52 may be an alternating power source. A switch 54 is coupled between the power supply 52 and the preheating element 58. The switch 54 may be a transistor switch controlled by a controller 90. For example, the switch 54 may be activated when the controller 90 detects a bead 10 is present in the partition of the respective holder, or has reached a certain location. Alternatively, the switch 54 may be a manually operated switch. Alternatively again, the switch 54 may be automatically operated on rotation of the means for moving the beads 10.

FIG. 5b shows an example of a heating means 60, 420 according to the present invention. The preheating means 60, 420 comprises a high-temperature heating element 68. The high-temperature heating element 68 is an electric heating element, such as a resistor. Here, the high-temperature heating element 68 constitutes part of a holder, and heats the outer surfaces of partitions making up the holder. In other embodiments, the heating means 60, 420 may comprise hot gas. In embodiments in which the beads are formed from a material that is capable of opto-luminescence, the heating means 60, 420 should not emit light that is detectable at the bead 10.

The heating means 60, 420, includes a high voltage power supply 62. The high voltage power supply 62 in this embodiment is a battery for supplying a direct current. In other embodiments, the power supply 62 may be an alternating power source. A switch 64 is coupled between the power supply 62 and the high-temperature heating element 68. The switch 64 may be a transistor switch controlled by a controller 90. For example, the switch 64 may be activated when the controller 90 detects a bead 10 is present in the partition of the respective holder, or has reached a certain location. Alternatively, the switch 64 may be a manually operated switch. Alternatively again, the switch 64 may be automatically operated on rotation of the means for moving the beads 10.

The holders are shown in FIGS. 5a and 5b for reference purposes only, and it would be clear to the skilled person that the holders are not themselves electrified other than to cause their rotation and heating depending on the embodiment. It would further be appreciated, as explained above, that the preheating means 50, 410 and heating means 60, 420 could take a number of forms, and may be separate from the means for moving the beads 10. For example, the heating element 68 may be disposed beneath the track 374 shown in FIG. 4 at a point in proximity to the light detector 80.

Figure 6:
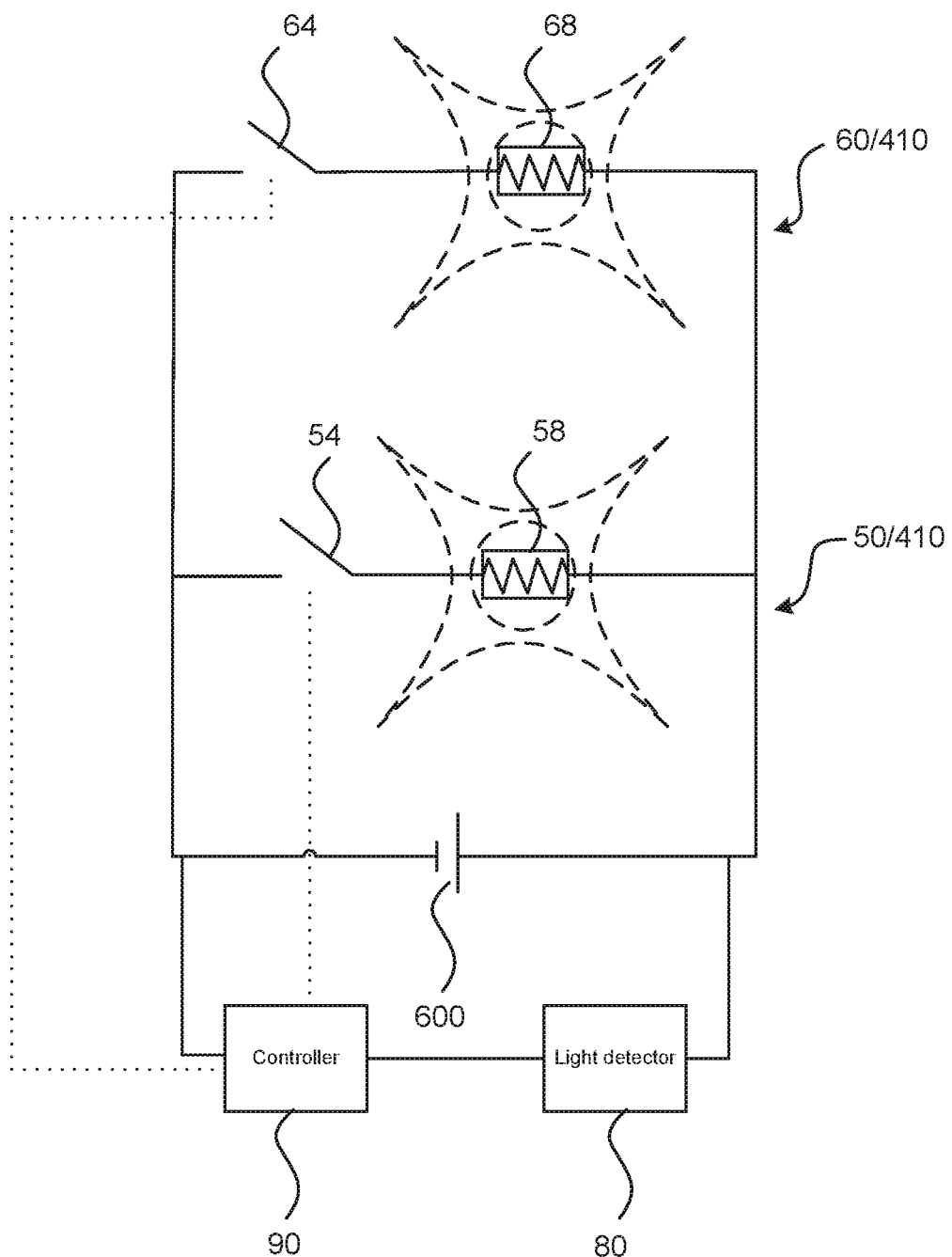
FIG. 6 shows another embodiment of means for heating beads of the reader of the present invention.

In the embodiment shown in FIG. 6, the preheating means 50/410 and heating means 60/420 are coupled to the same power supply 600. Switches 54, 64 control the supply of power to the heating elements 58, 68. The controller 90 is used to control the activation of the switches 54, 64 in order to turn the heating elements 58, 68 on or off. The controller 90 may control the switches 54, 64 in accordance with the rotation of the means for moving the beads 10. The controller 90 may also detect when a bead 10 is present in a partition of the holder, and activate the respective heating element 58, 68.

The power supply 600 is a high voltage power source capable of providing power to the high temperature heating element 68 such that it maintains a temperature of up to 700 degrees Celsius. Although not shown, a regulator or resistor in series with the preheating element 58 is used to reduce the voltage supplied by the power supply 600 to a level that that is manageable by the preheating element 58.

Figure 7:
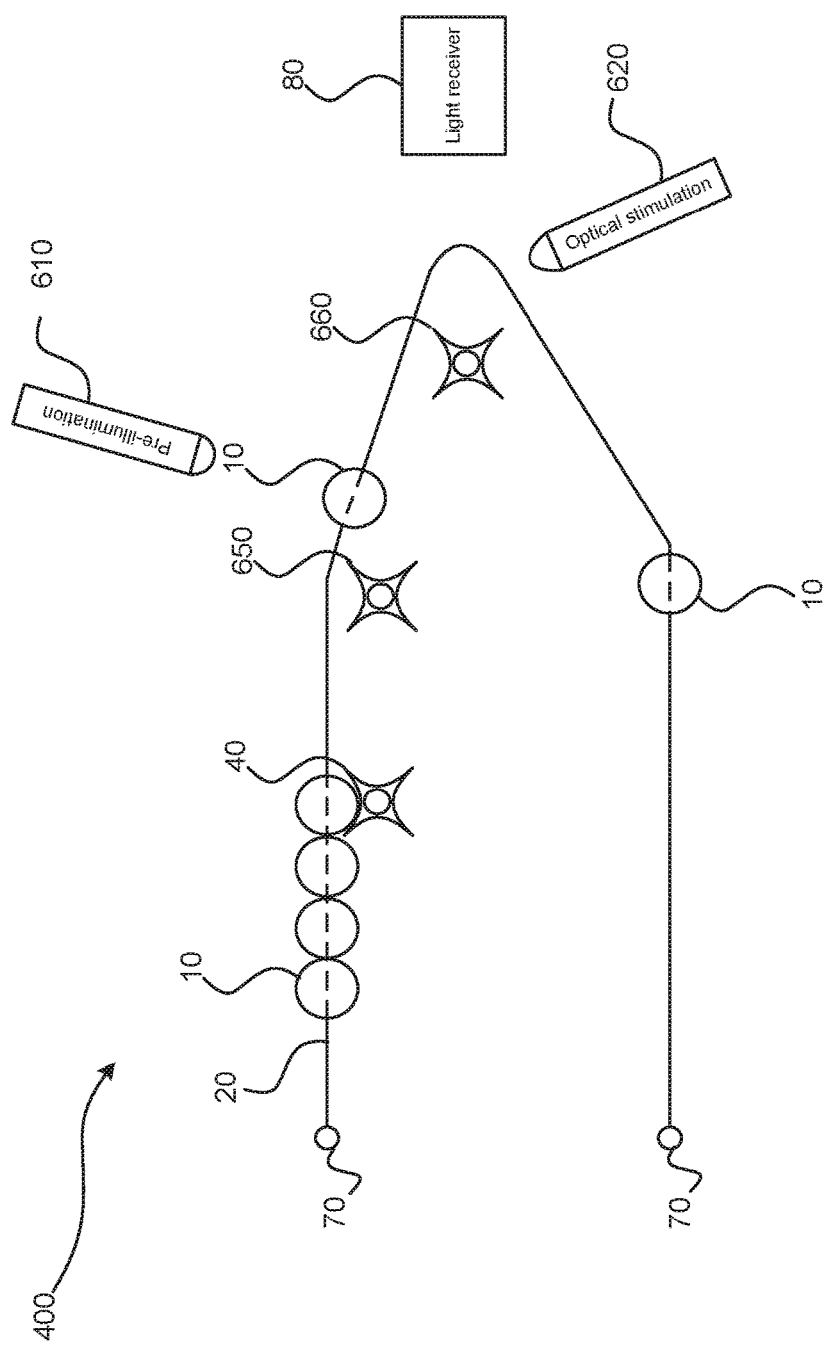
FIG. 7 shows a second embodiment of a reader according to the invention.

FIG. 7 shows a reader 400 according to another embodiment of the present invention. This embodiment relates to optically stimulated luminescence. Here, the beads 10 are kept in the dark prior to being read. Furthermore, the beads 10 are made of material that undergoes optically stimulated luminescence, such as glass or aluminium oxide. Although a high-temperature resistant fibre 20 is not essential in this embodiment, it is preferable for when the dosimeter 100 undergoes heat sterilisation.

In this embodiment, the first, second and third holders 40, 650, 660, are not heated. Instead, in place of the preheating means, a pre-illumination means 610 is disposed. The preheating means and pre-illumination means 610 are pre-stimulating means. The pre-illumination means 610 comprises a first irradiation unit. The pre-illumination means 610 is controlled to illuminate an individual bead 10 with light at a first intensity. The first intensity is sufficient to free any electrons that may be trapped in relatively shallow energy states and return these electrons to the ground state, without causing the bead 10 to undergo any luminescence. This ensures that the only excited electrons remaining in the bead are those which have been trapped in high-energy states as a result of exposure to radiation. The first irradiation unit 610 in this embodiment is a lamp. The pre-illumination means 610 does not heat the bead. It would be understood that the pre-illumination means 610 is not essential to the inventive concept.

The optical stimulating means 620 in this embodiment is a second irradiation unit. Here, the second irradiation unit 620 is a high-intensity LED or a laser. The optical stimulating means 620 is controlled to stimulate a bead 10 using light of an intensity greater than that generated by the pre-illumination means 610. The optical stimulating means 620 illuminates the bead 10 with light of an intensity necessary to cause it to luminesce.

Although not shown in FIG. 7, the controller 90 and memory 95 of FIG. 4 are present in the embodiment of FIG. 7.

Figure 8:
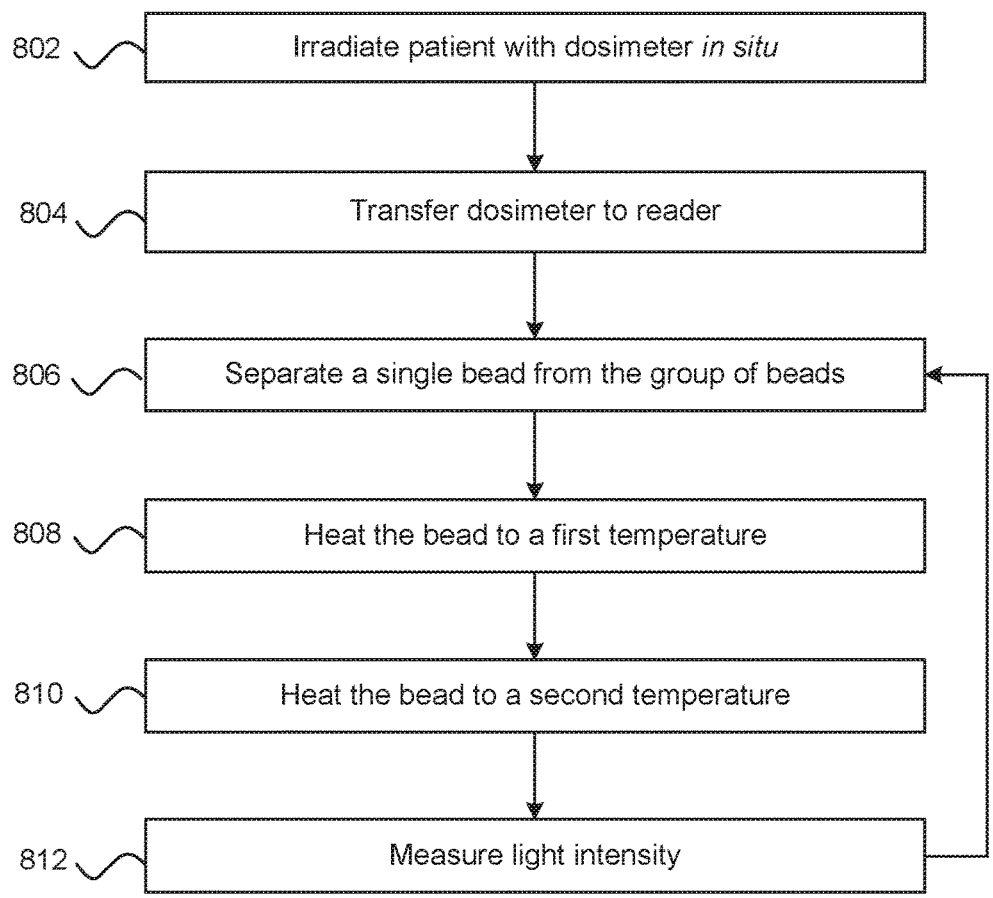
FIG. 8 shows a method of recording and measuring radiation exposure according to the invention.

A method of recording and reading a level of radiation will now be described with reference to FIG. 8. In step 802, whilst the dosimeter 100 is in-situ the patient is exposed to radiation targeted on at least one of the beads 10, for example, during radiotherapy treatment. The dosimeter 100 could be placed on the skin, or inserted into the body via an incision or a natural orifice. The beads 10 may be inserted directly, or may be inserted into the body inside a casing such as a catheter. Particularly, where the beads 10 are stimulated to luminesce using an optical stimulating means 620, the beads 10 are inserted into the body in a dark casing to prevent information from being lost.

In step 804, the dosimeter 100 is extracted from the patient. The dosimeter 100 is transferred to a reader 200, 400. In other words, the high-temperature fibre 20 is threaded around guides on the reader 200, 400, and the plurality of beads 10 are positioned in a first unheated region.

In step 806, a separation means 40, such as a first holder, separates a single bead from the plurality of beads. The bead 10 is pushed along the high-temperature resistant fibre 20, until it reaches a preheating means 50. In this embodiment, the preheating means 50 is a second holder. The second holder 50 comprises a heating element 58 that heats the bead 10 to a first temperature to free any electrons that may be trapped in relatively shallow energy states and return these electrons to the ground state, without causing the bead 10 to thermo-luminesce.

The bead 10 is then passed on to a further heating means 60, where the heating means 60 is placed in proximity to a light detector 80. In step 810, the bead 10 is heated to a second temperature by the second heating means 60 such that it undergoes thermo-luminescence. In some embodiments, alternatively or additionally to the heating means 60, an optical stimulating means 620 is used to illuminate the bead such that it undergoes luminescence. In these embodiments, the high-temperature resistant fibre 20 is not necessary.

In step 812, the light intensity generated by the bead 10 undergoing thermo-luminescence is measured. The measured light intensity is directly related to the radiation exposure in step 802, and so the level of radiation experienced by that particular bead 10 can be calculated.

The process then repeats from step 806 until all beads 10 on the dosimeter 100 have been processed.

Advantages of the dosimeter 100 reside in the provision of at least one bead 10 being coupled to a high-temperature resistant fibre 20. Advantageously, the dosimeter 100 provides a simple and convenient means for recording a level of radiation exposure in a patient. The high-temperature resistant fibre 20 allows the dosimeter 100 to be flexible. The dosimeter 100 can be transported to a reading apparatus (reader) 200, 300, 400 after exposure to radiation has occurred, with reduced loss of data. The dosimeter 100 can be inserted into a human or animal body without damage occurring to the dosimeter 100 due to moisture. Furthermore, the dosimeter 100 provides a means for performing 2-dimensional dosimetry. A high maximum radiation dosage can be measured when using beads 10, particularly glass beads, which can store data in excess of 100 Gy before saturation.

Embodiments of the invention have been described in which a dosimeter comprises a plurality of silica beads threaded onto a fibre. In some embodiments, the beads 10 may be omitted and the fibre 20 itself can be used to capture information about the radiation dosage using a similar mechanism to that described above with respect to the beads. For example, in some embodiments the dosimeter can comprise a high-temperature resistant silica fibre 20, without any beads 10 threaded onto the fibre 20. Since the silica fibre 20 can have similar luminescence and radiological properties as the beads 10 of the above-described embodiments, the silica fibre 20 can capture information about the radiation dosage in the form of electrons trapped in excited energy states, which can subsequently be triggered to relax into a lower energy state thereby releasing information about the energy of the radiation dosage in the form of a photon.

Figure 9:
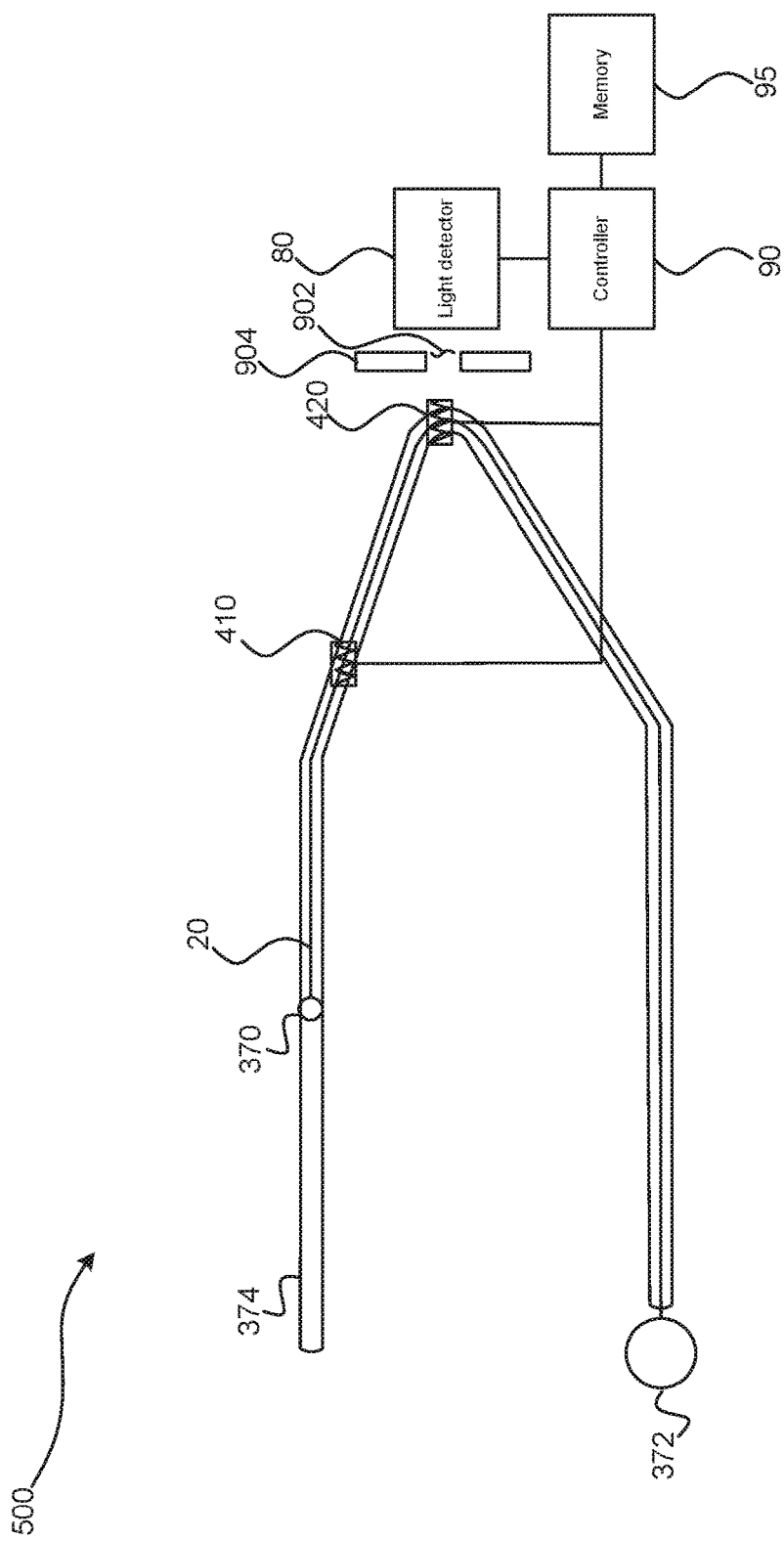
FIG. 9 shows a third embodiment of a reader according to the invention.

FIG. 9 shows an embodiment of a reader 500 for use when the dosimeter comprises a simple fibre 20 without any beads. In addition to the features shown in FIG. 4, the reader 500 further comprises a light blocking member 904 disposed between the light detector 80 and the high-temperature resistant fibre 20. The light blocking member 904 comprises an aperture 902 configured to transmit light, such that the light detector 80 will only receive light emitted from a part of the fibre 20 that is visible to the detector 80 through the aperture 902 in the light blocking member 904. This arrangement enables a dosage reading to be obtained from a discrete segment of the fibre 20, which in turn allows measurements to be obtained of the radiation dosage at different positions along the fibre 20 by drawing the fibre 20 through the reader and recording measurements using the light detector 80 when a segment of interest is visible through the aperture 902 in the light blocking member 904. In other words, the region of the fibre 20 visible through the aperture 902 is the region of the fibre 20 currently being stimulated to allow a dosage to be read. Depending on the embodiment, readings may be recorded at predefined regular intervals along the fibre 20, or at arbitrary intervals specified by an operator, or readings may be taken continuously as the fibre 20 is drawn through the reader.

Advantages of the reader 200, 300, 400, 500 reside in the provision of a means for heating a dosimeter 100 and a light detector 80. These advantages include being a cheap, fast, reliable and simple way to read radiation dosage information. By separating individual beads 10 before stimulation, there is no loss of radiation dosage information. Additionally, the relative positions of the beads 10 can be used to determine at which part of the patient the bead 10 was located when it was exposed to radiation. Furthermore, by preheating the bead 10 before measuring the thermo-luminescence of the bead 10, or by pre-illuminating the bead 10 before measuring the luminescence of the bead 10, the amount of time required to process a dosimeter 100 is reduced.

Whilst certain embodiments of the invention have been described herein with reference to the drawings, it will be understood that many variations and modifications will be possible without departing from the scope of the invention as defined in the accompanying claims.

The invention claimed is:

1. A dosimeter for recording a level of radiation exposure, the dosimeter comprising:
   a fibre;
   a plurality of luminescent beads threaded onto the fibre; and
   at least one separator positioned between groups of beads along the fibre.

2. The dosimeter according to claim 1, wherein the plurality of beads are threaded onto the fibre such that each one of said beads can slide along the fibre.

3. The dosimeter according to claim 1, wherein the fibre is a high-temperature resistant fibre,
   optionally wherein the fibre is a thin metallic wire or a high-temperature resistant yarn,
   optionally wherein the high-temperature resistant fibre is configured to withstand temperatures of at least 700 degrees Celsius,
   optionally wherein the at least one bead is spherical,
   optionally wherein the fibre is tied at the ends to prevent beads from falling off the fibre,
   optionally wherein the dosimeter comprises a plurality of beads and the beads have different colours with respect to each other, and
   wherein the dosimeter optionally comprises an identification unit for uniquely identifying the dosimeter among a plurality of dosimeters.

4. Apparatus for measuring the level of radiation recorded by a dosimeter, the apparatus comprising:
   a holder configured to hold the dosimeter, the dosimeter comprising a fibre, a plurality of luminescent beads threaded onto the fibre, and at least one separator positioned between groups of beads along the fibre;
   a stimulating unit configured to stimulate one of the plurality of beads to cause luminescence;
   a light detector for measuring intensity of light produced by said one of the beads during luminescence; and
   a mechanism for moving said one of the beads from a first region of the apparatus to a second region of the apparatus in proximity to the light detector.

5. The apparatus according to claim 4, further comprising a light blocking member having an aperture arranged between the light detector and the region of the dosimeter that is stimulated by the stimulating unit.

6. The apparatus according to claim 4, wherein the stimulating unit comprises an optical stimulating unit configured to illuminate the region of the dosimeter with light of an intensity sufficient to cause electrons trapped in high-energy states the region of the dosimeter to luminesce and/or a heating unit configured to heat the region of the dosimeter to a first temperature threshold sufficient to cause electrons trapped in high-energy states in the region of the dosimeter to thermo-luminesce,
  optionally wherein the light detector is a photomultiplier tube, and
  wherein the stimulating unit is optionally disposed in proximity to the light detector.

7. The apparatus according to claim 6, further comprising a pre-stimulating unit disposed between the first region and the second region in proximity to the light detector.

8. The apparatus according to claim 7, wherein the pre-stimulating unit is configured to heat the region of the dosimeter to a second temperature threshold, wherein the second temperature threshold is sufficient to free any electrons trapped in low-energy states in the region of the dosimeter and return them to the ground state and not sufficient to free any electrons trapped in high-energy states in the region of the dosimeter.

9. The apparatus according to claim 6, wherein the optical stimulating unit and pre-illumination unit comprise an irradiation unit.

10. The apparatus according to claim 6, wherein the preheating unit and/or heating unit comprises a heating element provided beneath the region of the dosimeter when the region of the dosimeter is positioned between the first region and the second region, and in the second region, respectively.

11. The apparatus according to claim 4, further comprising a controller for converting the measured light intensity into an indicator of level of radiation exposure, and/or a display for displaying the level of radiation exposure.

12. The apparatus according to claim 11, further comprising a display for displaying the level of radiation exposure,
  optionally wherein the apparatus further comprises an identifier for identifying the dosimeter,
  optionally wherein the region of the dosimeter comprises at least one bead and the controller is optionally configured to identify the measured bead,
  optionally wherein the heating unit and/or the preheating unit comprise rotatable holders configured to move the at least one bead along the fibre, and
  optionally wherein the heating unit is a planchet.

13. The apparatus according to claim 11, wherein the controller is configured to activate the pre-stimulating unit and/or the stimulating unit when the region of the dosimeter is in contact with a predetermined location.

14. A system comprising:
a dosimeter comprising a silica fibre; and
apparatus according to claim 4.

15. A system comprising:
a dosimeter according to claim 1; and
an apparatus according to claim 4.

16. A method of recording a level of radiation exposure in a patient, the method comprising:
  coupling at least one luminescent bead to a fibre, and positioning at least one separator between groups of beads along the fibre;
  feeding the fibre and the at least one bead through an area of the patient's body to be irradiated;
  irradiating the patient; and
  removing the irradiated at least one bead and fibre from the patient.

17. A method comprising:
  attaching an irradiated dosimeter to a reader, the dosimeter comprising a fibre, a plurality of luminescent beads threaded onto the fibre, and at least one separator positioned between groups of beads along the fibre;
  stimulating a region of the dosimeter to cause it to luminesce; and
  measuring the intensity of light generated by the region of the dosimeter.

18. The method according to claim 17, wherein stimulating the region of the dosimeter comprises optically stimulating the region of the dosimeter with light of an intensity sufficient to cause electrons trapped in high-energy states in the region of the dosimeter to luminesce and/or heating the region of the dosimeter to a first temperature threshold set to cause electrons trapped in high-energy states in the region of the dosimeter to thermo-luminesce.

19. The method according to claim 18, wherein pre-stimulating the region of the dosimeter comprises heating the region of the dosimeter to a second temperature threshold, wherein the second temperature threshold is sufficient to free any electrons trapped in low-energy states in the region of the dosimeter and return them to the ground state and not sufficient to free any electrons trapped in high-energy states in the region of the dosimeter.

20. The method according to claim 17, further comprising moving the region of the dosimeter from a first region to a second region in proximity to a light detector,
  optionally wherein the region of the dosimeter comprises at least one luminescent bead,
  optionally wherein the method further comprises separating one bead from a plurality of beads, and moving the one bead from the first region to the second region in proximity to the light detector,
  optionally wherein the method further comprises pre-stimulating the at least one bead before the at least one bead moves to the second region in proximity to the light detector,
  optionally wherein the method further comprises identifying the measured bead,
  optionally wherein the method further comprises determining the location of the at least one bead and stimulating the at least one bead or pre-stimulating the at least one bead according to the determination,
  optionally wherein the method further comprises reading and storing identification information from the dosimeter, and
  optionally wherein the method further comprises converting the measured light intensity into a level of radiation exposure, based on a known correlation between intensity of light and level of radiation exposure for a material from which the region of the dosimeter is formed.

* * * * *